United States Patent [19]
Neugebauer

[11] Patent Number: 5,853,279
[45] Date of Patent: Dec. 29, 1998

[54] OVERCAB CARRIER DEVICE

[76] Inventor: Harlan Neugebauer, 4831 West Vogel Ave., Glendale, Ariz. 85302

[21] Appl. No.: 979,487

[22] Filed: Nov. 28, 1997

[51] Int. Cl.⁶ ........................................................ B60P 1/43
[52] U.S. Cl. .............................. 414/462; 414/494; 414/500
[58] Field of Search .................................... 414/462, 477, 414/480, 491, 494, 498, 500, 537, 538

[56] References Cited

U.S. PATENT DOCUMENTS

| | | | |
|---|---|---|---|
| 2,082,663 | 6/1937 | Slater | 414/494 X |
| 2,753,063 | 7/1956 | Abel | 414/462 |
| 3,460,693 | 8/1969 | Oldham | 414/462 |
| 3,716,157 | 2/1973 | Mittler et al. | 414/500 X |
| 3,871,540 | 3/1975 | Jenkins | 414/462 |
| 3,872,989 | 3/1975 | Smithson et al. | 414/462 |
| 3,877,594 | 4/1975 | Coakley | 414/462 |
| 3,894,643 | 7/1975 | Wilson | 414/462 |
| 3,927,779 | 12/1975 | Johnson | 414/462 |
| 3,972,433 | 8/1976 | Reed | 414/462 |
| 4,234,285 | 11/1980 | Martinez | 414/462 |
| 4,239,438 | 12/1980 | Everson | 414/462 |
| 4,368,002 | 1/1983 | Krzyzosiak, Jr. | 414/494 |
| 4,394,912 | 7/1983 | Epps et al. | 212/189 |
| 4,531,879 | 7/1985 | Horowitz | 414/462 |
| 4,536,009 | 8/1985 | Asworth | 280/755 |
| 4,953,757 | 9/1990 | Stevens et al. | 224/310 |
| 5,069,595 | 12/1991 | Smith et al. | 414/462 |
| 5,071,308 | 12/1991 | Tibbet | 414/462 |
| 5,211,526 | 5/1993 | Robinette | 414/462 |
| 5,505,579 | 4/1996 | Ray et al. | 414/462 |
| 5,511,928 | 4/1996 | Ellis | 414/462 |
| 5,586,856 | 12/1996 | Springer | 414/462 |
| 5,603,600 | 2/1997 | Egan et al. | 414/462 |
| 5,639,207 | 6/1997 | Green | 414/494 X |

*Primary Examiner*—Janice L. Krizek
*Attorney, Agent, or Firm*—Frank J. McGue

[57] ABSTRACT

A balance point carriage device is provided which is suitable for use with a vehicle. The balance point carriage device comprises a support frame mounted to a frame of the vehicle with a rail assembly mounted to the support frame at a pivot. A carriage is slidably mounted on the rail assembly. The pivot is positioned at a balance point of the combination of the fixed rail assembly and the carriage. A foldable frame assembly is mounted to the frame of the vehicle with one end of the rail assembly being detachably secured to the foldable frame assembly. The rail assembly has a hauling position parallel to the ground when secured to the foldable frame assembly. The rail assembly rotates about the pivot to a loading position which is tilted to the ground in the direction of the foldable frame assembly when detached from the foldable frame assembly.

18 Claims, 6 Drawing Sheets

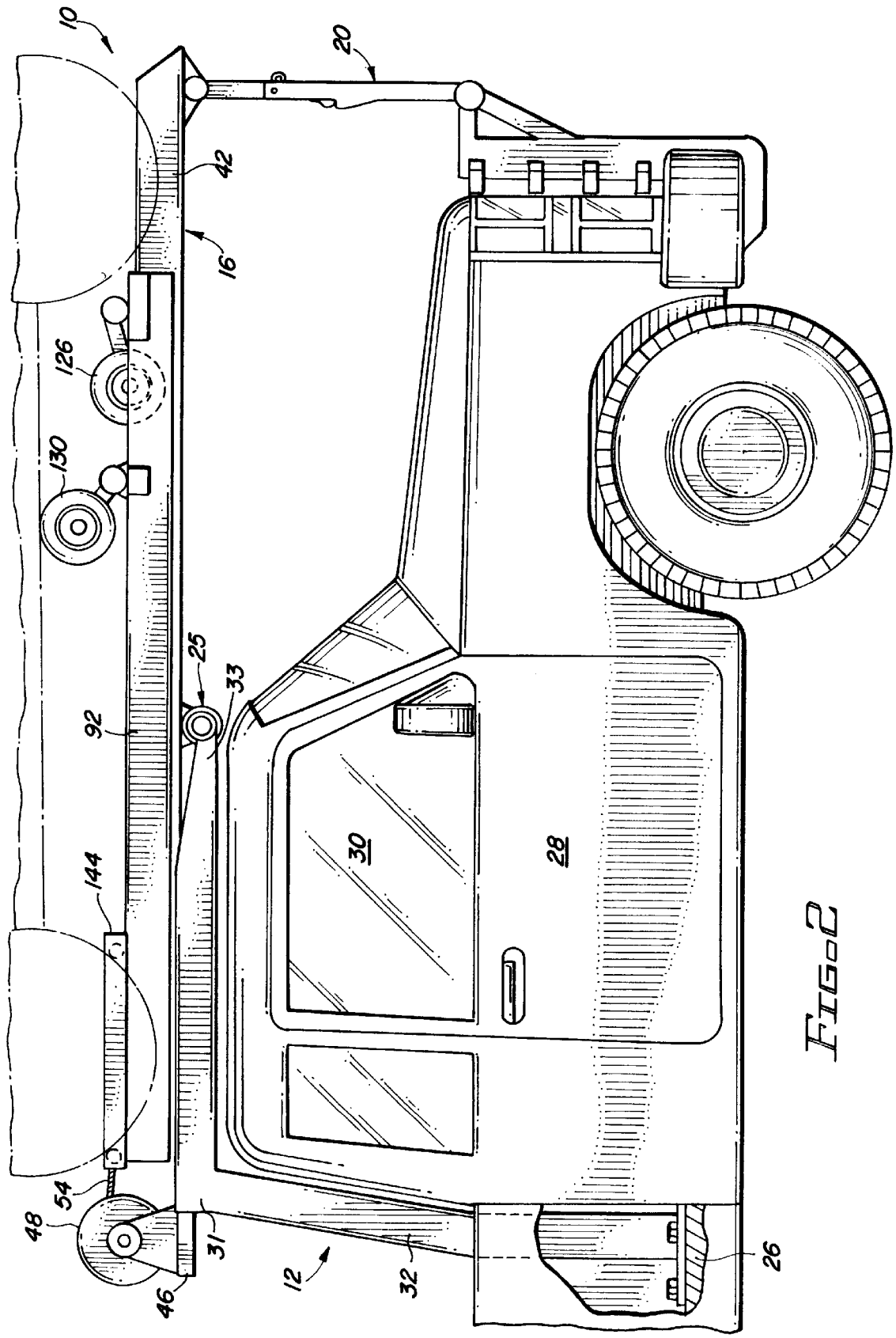

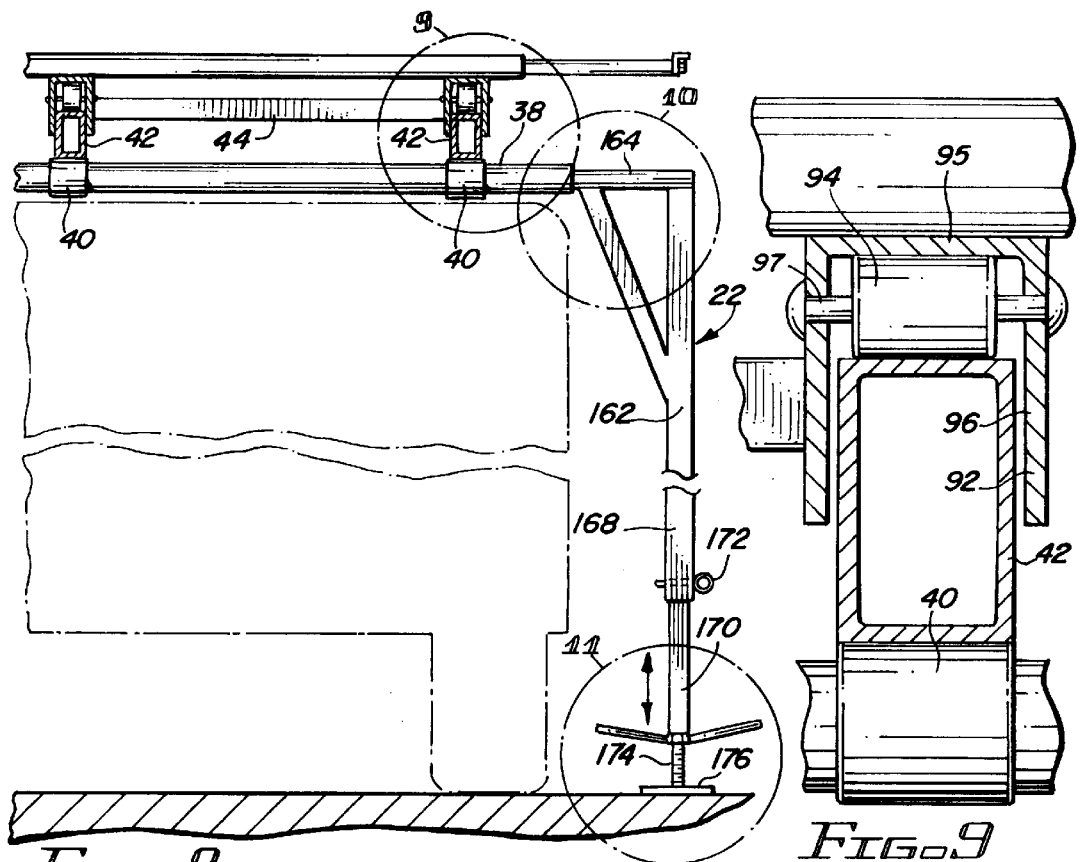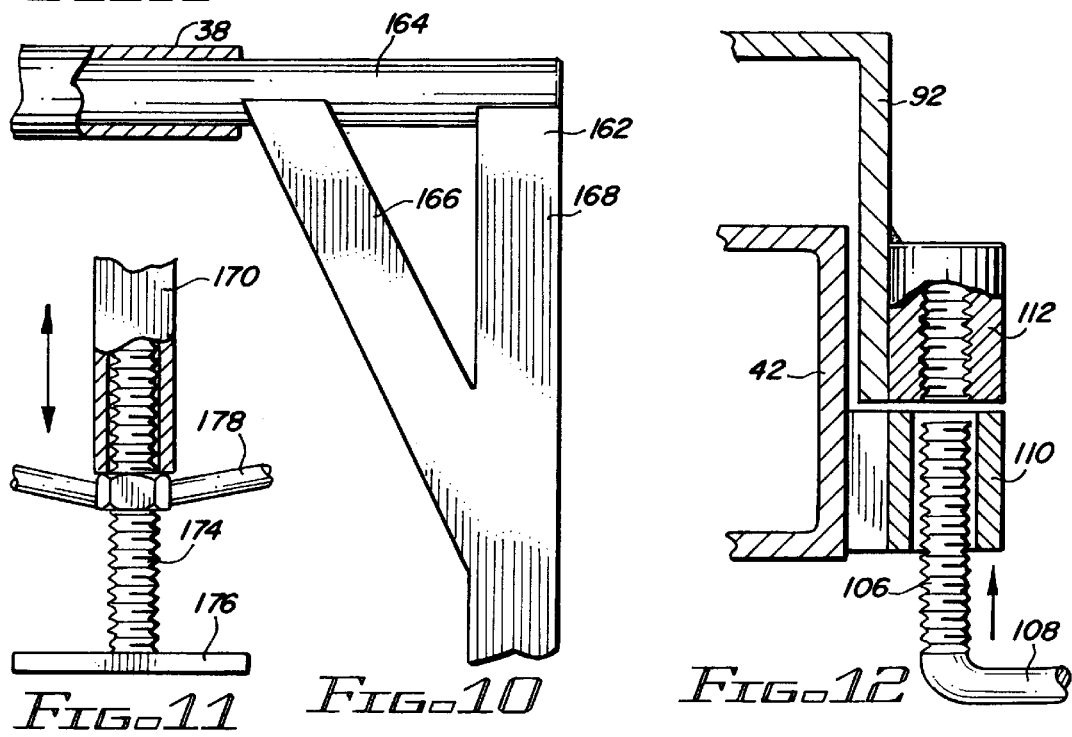

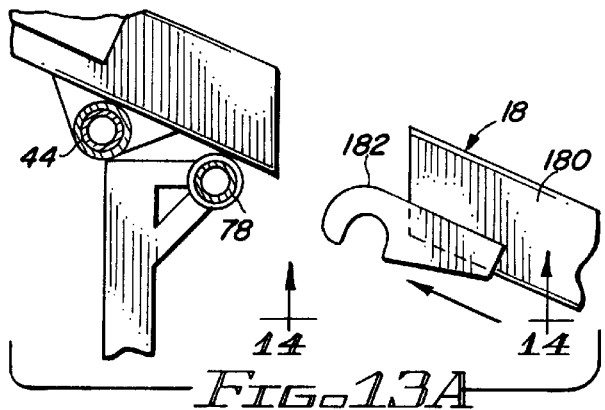
FIG. 13A
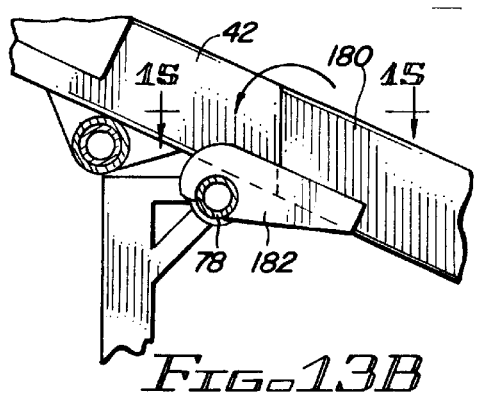
FIG. 13B
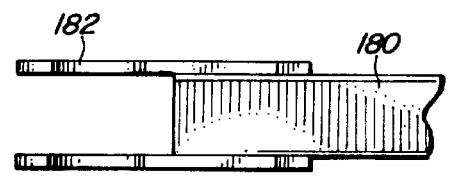
FIG. 14
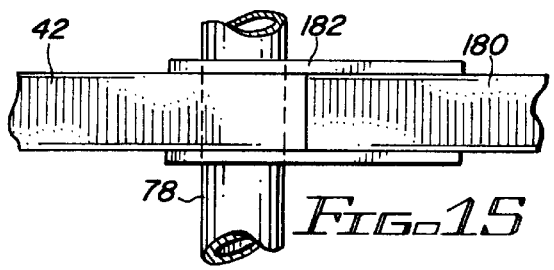
FIG. 15
FIG. 16A
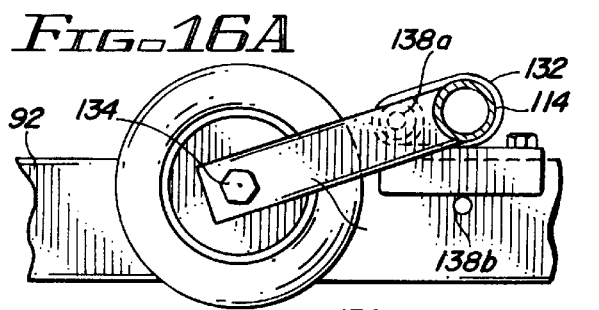
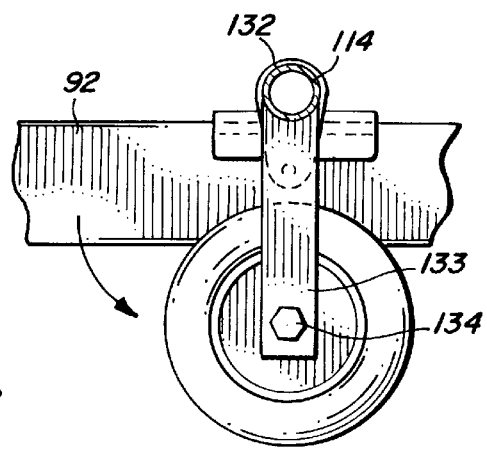
FIG. 16B
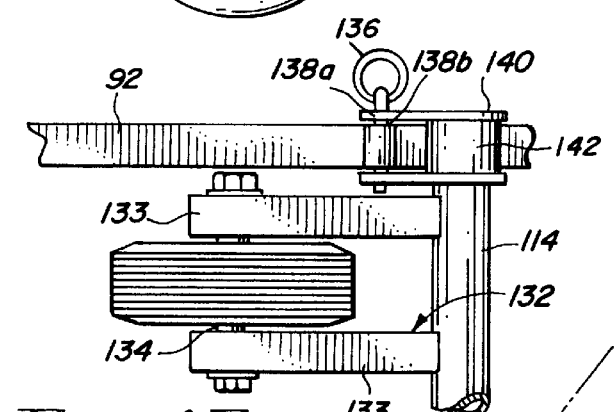
FIG. 17
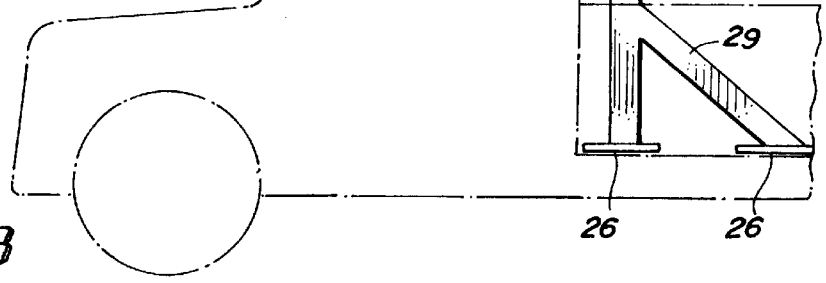
FIG. 18

OVERCAB CARRIER DEVICE

TECHNICAL FIELD

This invention relates to the field of loading and hauling devices, and, more particularly, to loading and hauling devices for transporting small vehicles, boats and similar objects on the roof of a conventional vehicle.

BACKGROUND OF THE INVENTION

Various types of loading and hauling devices are known in the art. These devices generally, though not always, load from the rear of a truck or other conventional vehicle which requires, for example, detaching any trailers to load or unload the carried object.

U.S. Pat. No. 5,071,308 entitled "Apparatus for Loading and Carrying Boats" which issued on Dec. 10, 1991 to Tibbet discloses an apparatus for loading and carrying boats in which a boat may be supported above a pickup truck and has a front support. Extensible, pivotable rails are utilized as well as a winch mounted near the rear of the rails.

U.S. Pat. No. 5,511,928 entitled "Boat Loading Device" which issued on Apr. 30, 1996 to Ellis discloses the use of removable ground support members.

U.S. Pat. No. 4,531,879 entitled "Boat Loading and Carrying Device" which issued on Jul. 30, 1985 to Horowitz provides a pivotable roof mounted boat loading and carrying device. The device includes sleeves which are fitted over and rotatable about a cross member.

U.S. Pat. No. 5,603,600 entitled "Telescoping Personal Watercraft Jet Track" which issued on Feb. 18, 1997 to Egan et al. shows a telescoping track for loading and unloading a personal watercraft. A hinge assembly allows two sections to pivot together.

U.S. Pat. No. 5,505,579 entitled "Sliding Carrier" which issued on Apr. 9, 1996 to Ray et al. shows a bicycle carrier having both rotatable and extensible features.

U.S. Pat. No. 3,972,433 entitled "Self Loading and Carrying Apparatus" which issued on Aug. 3, 1976 to Reed and U.S. Pat. No. 3,927,779 entitled "Car Top Carrier For Boats And The Like" which issued on Dec. 23, 1975 to Johnson both show racks having pivotable and extensible features.

None of the known prior art disclose the combination set forth herein.

SUMMARY OF THE INVENTION

It is an object of this invention to provide a loading and hauling device for transporting small vehicles, boats and similar objects on the roof of a conventional vehicle which is front loading.

It is a further object of this invention to provide a loading and hauling device which utilizes a balance point to assist in loading the device atop the roof of a conventional vehicle.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 2 is a side view of the embodiment of FIG. 1 in the hauling position;

FIG. 8 is a partial cross sectional front view showing a brace used in the loading position;

FIG. 9 is a partial cross sectional front view of the circled area 9 of FIG. 8;

FIG. 10 is a partial cross sectional front view of the circled area 10 of FIG. 8;

FIG. 11 is a partial cross sectional front view of the circled area 11 of FIG. 8;

FIG. 12 is a partial cross sectional side view of the circled area 12 of FIG. 1;

FIGS. 13A and 13B show a side view detail on the means for attaching extension rails for use in the loading position;

FIG. 14 is a bottom view of FIG. 13A taken along line 14—14;

FIG. 15 is a top view of FIG. 13B taken along line 15—15;

FIGS. 16A and 16B show a carriage wheel in the hauling position and the loading position, respectively, taken along line 16—16 of FIG. 1;

FIG. 17 shows a top view of the carriage wheel in the hauling position;

FIG. 18 shows a side view of a support frame used in the present invention; and

DESCRIPTION OF THE PREFERRED EMBODIMENT

Figure 1:
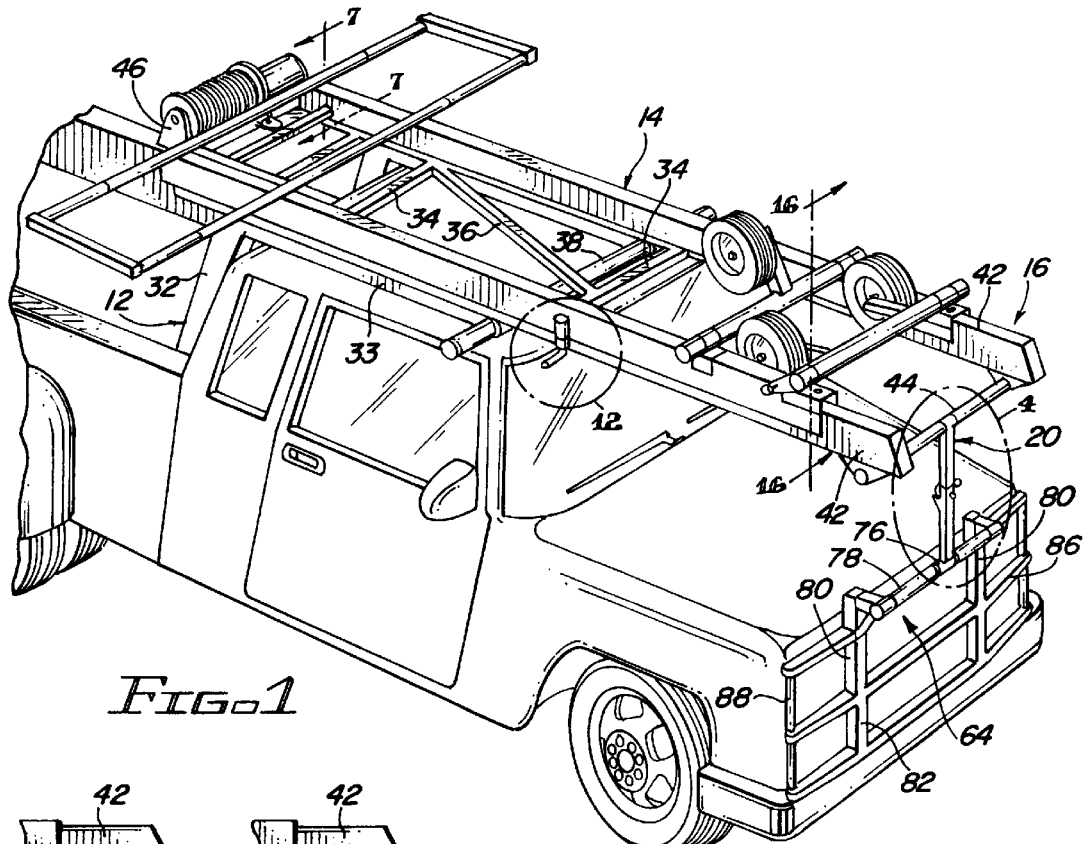
FIG. 1 is a perspective view of one embodiment of the present invention in a hauling position.

Referring more particularly to the drawings by characters of reference, FIGS. 1–19 disclose combinations of features of the present invention which constitute various embodiments of a balance point carriage device 10. Balance point carriage device 10 comprises a rear support frame 12, a carriage 14, a rail assembly 16, a foldable front frame assembly 20, and detachable side jacks 22.

Figure 19A:
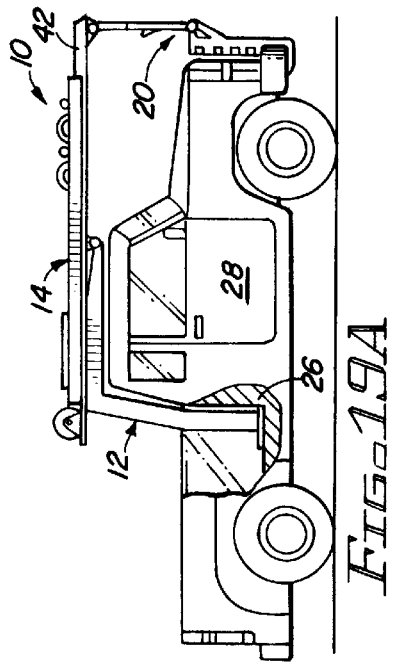
FIGS. 19A–G show a side view of the process of transforming the present invention from the hauling position to the loading position.
Figure 19B:
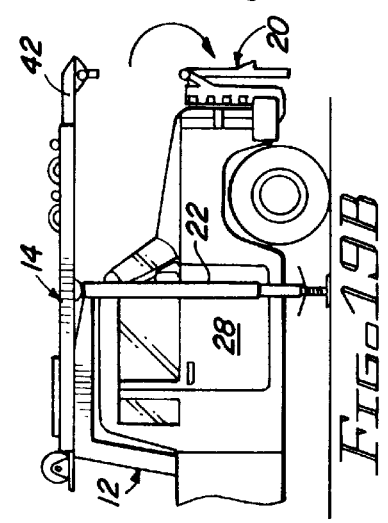
Figure 19C:
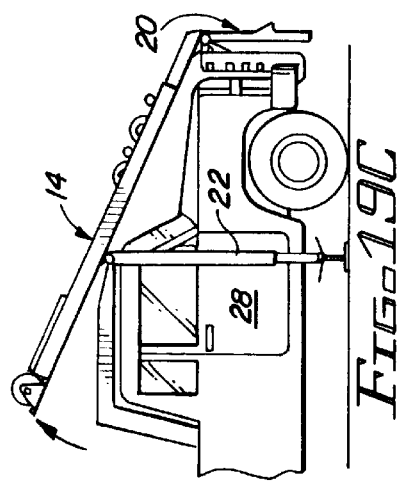
Figure 19D:
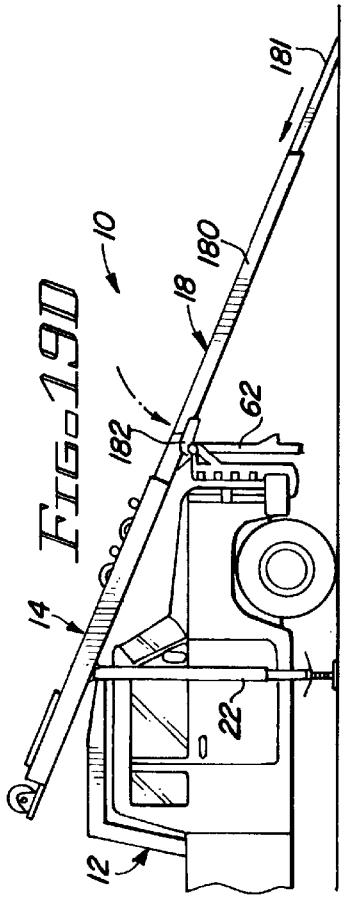
Figure 19E:
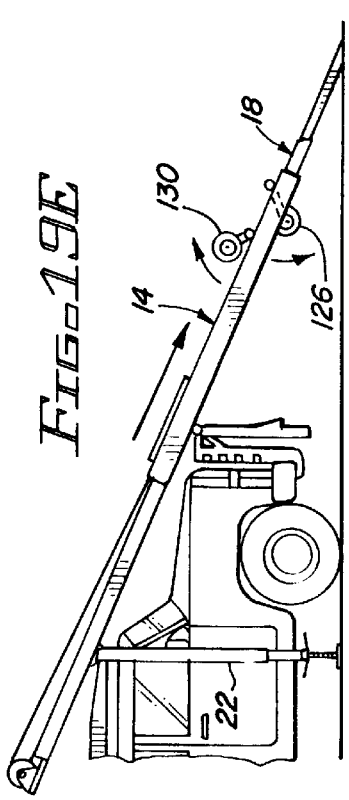
Figure 19F:
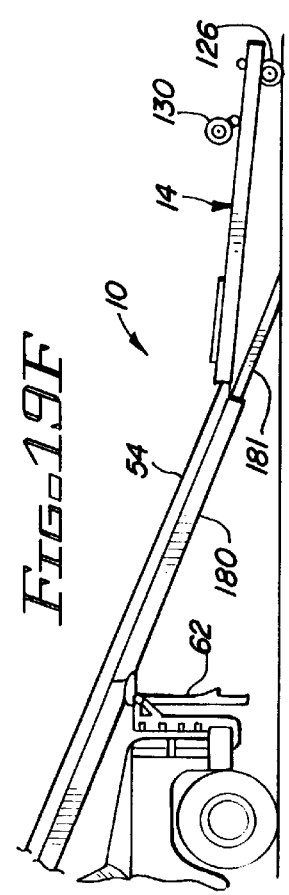
Figure 19G:
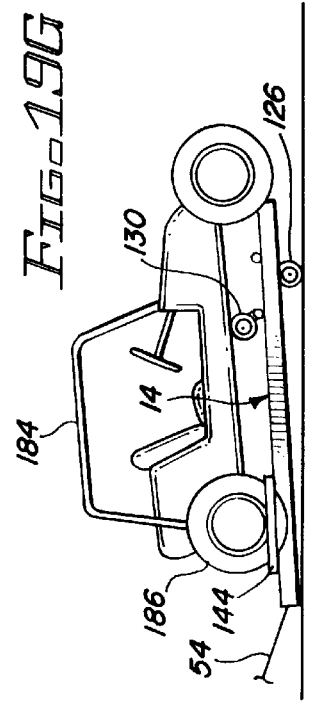

Carriage device 10 has a hauling position best seen in FIG. 19A, a loading position best seen in FIGS. 19F and 19G, and transitions between the hauling position and the loading position with a series of steps shown in FIGS. 19B through 19E.

As shown in FIGS. 1 and 19A, in the hauling position, carriage 14 is slidably mounted on fixed rail assembly 16. Fixed rail assembly 16 in turn is mounted to rear support frame 12 at a pivot 25. Rear support frame 12 is, in turn, secured to a frame 26 of a truck 28. Fixed rail assembly 16 is detachably secured to foldable front frame assembly 20, which, in turn is mounted to the front of frame 26.

When front frame assembly 20 is in the hauling position, fixed rail assembly 16 is parallel to the ground and fully supports carriage 14 and whatever load is mounted thereon. A key component of the present invention is mounting carriage 14 and fixed rail assembly 16 to rear support frame 20 at pivot 25. Pivot 25 is positioned at approximately the middle, or balance point, of both fixed rail assembly 16 and carriage 14 which are positioned at the front of a cab 30 of truck 28.

As best seen in FIGS. 1 and 18, rear support frame 12 includes two inverted L-shaped members 31 each having a vertical leg 32 and a horizontal leg 33. Vertical leg 32 is mounted, preferably via welding, to frame 26 of truck 28. In the illustrated embodiment, legs 32 are positioned directly to the rear of cab 30 on opposing sides of truck 28. As shown in FIG. 18, an angled leg 29 extending from the rear of vertical leg 32 to frame 26 may be provided for additional support.

Extending forwardly from the top of each vertical leg 32 to the front of cab 30 are parallel horizontal legs 33. Two lateral cross members 34 and an angled cross member 36 extending between horizontal legs 33 provide strong, rigid structure connected directly to frame 26.

As best seen in FIGS. 1 and 8, mounted to and extending between the forward ends of horizontal legs 33 is a hollow tubular member 38. Two bearing collars 40, preferably U-bolts, are rotatably mounted on opposing sides of tubular member 38, thereby forming, in combination, pivot 25.

Fixed to the top of each bearing collar 40 is a fixed rail 42. Bearing collar 40 is mounted, preferably welded, at approximately the center of each fixed rail 42 at the front of corresponding horizontal leg 33. Fixed rails 42 are parallel and extend forwardly and rearwardly from bearing collars 40. Fixed rails 42 are interconnected via cross pieces 44 to form a rigid structure.

The portion of fixed rail 42 extending rearwardly from bearing collar 40 will engage the top of the corresponding horizontal leg 33 when fixed rails 42 are parallel to the ground. This engagement of rail 42 and leg 33 limits the rearward rotation of fixed rails 42 about tubular member 38 in the counterclockwise direction as seen in FIGS. 19A–G.

Mounted to the rear of each fixed rail 42 is a winch platform 46. Centered between fixed rails 42 atop winch platform 46 is winch 48. Winch 48 comprises electric motor 50, spindle 52 and cable 54 wound about spindle 52. Such winches are well known in the art and commercially available from a number of sources and thus will not be further described herein.

To limit the forward rotation of fixed rails 42 in the clockwise direction, front frame assembly 20 is provided. In the illustrated embodiment, front frame assembly 20 preferably comprises a bearing 56, an elongated piece 60, an elongated sleeve 62 and a forward frame 64.

Bearing 56 is rotatably mounted to front cross piece 44 and further has a sleeve 66 extending downwardly therefrom. Elongated piece 60 has one end which slides into sleeve 66 and a ball 68 is mounted to the opposing end. A slot 70 extending laterally therethrough is positioned approximately at the midpoint of elongated piece 60.

Preferably, elongated piece 60 slides into and is captured within elongated sleeve 62. In the presently preferred embodiment, both sleeve 62 and piece 60 are square tubular shapes. The interior dimensions of sleeve 62 are sized to allow piece 60 to be received therein via an open side 61 thereof.

Sleeve 62 further includes at one end thereof a second slot 72 which corresponds to slot 70 on elongated piece 60. At approximately the midpoint of sleeve 62, a cavity 74 is provided which captures and supports ball 68. At the opposing end, a second bearing 76 rotatably engages a front frame cross piece 78 of forward frame 64.

As best seen in FIG. 1, forward frame 64 includes front frame cross piece 78 which is mounted between two small inverted L-shaped members 80. Each L-shaped member 80 includes a small vertical leg 82 mounted to frame 26 of truck 28. A small horizontal leg 84 extends forwardly from the top of each small vertical leg 82. Front cross piece 78 is mounted between the forward portions of the two small horizontal legs 84. In the presently preferred embodiment, forward frame 64 further provides lateral cross members 86 extending between and outwardly from vertical legs 82 as well as vertical cross members 88 extending between the ends of lateral cross members 86 for added support.

Figures 4, 5, 6, 7:
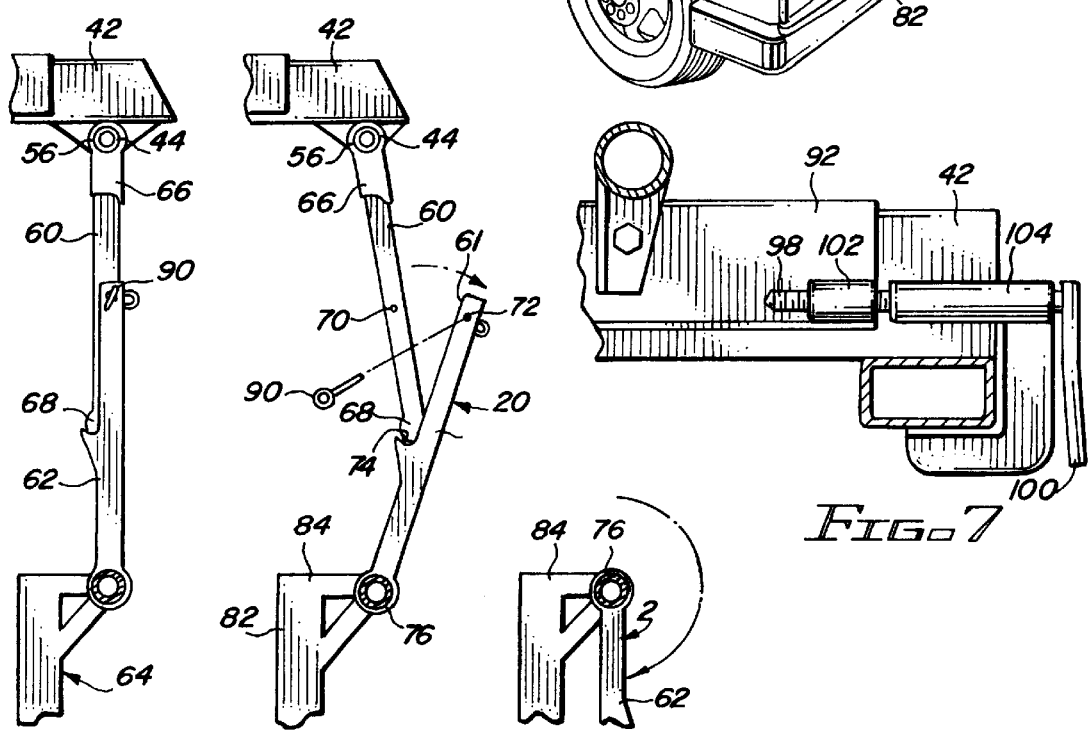
FIG. 4 is a side view of the circled area 4 in FIG. 1 in the hauling position.
FIG. 5 is a side view of FIG. 4 showing a transition from the hauling position to a loading position.
FIG. 6 is a side view of FIG. 4 in the loading position.
FIG. 7 is a cross sectional side view of the embodiment of FIG. 1 taken along line 7—7.

In the hauling position best seen in FIG. 4, sleeve 66 extends downwardly and encompasses one end of piece 60. Ball 68 of piece 60 is captured within cavity 74 and the body of piece 60 is captured within the sleeve 62 via open side 61. A pin 90 extends through slots 70 and 72 to hold the front frame assembly in the hauling, or upright, position. In the preferred embodiment, front frame assembly 20 is long enough in the hauling position to create an upward force which, via pivot 25, creates a downward force engaging horizontal legs 33 against fixed rails 42. This force results in the weight of the hauled item being distributed directly to frame 26 via vertical legs 32 and front frame assembly 20.

To drop to the loading position, pin 90 is removed as best seen in FIG. 5. Elongated sleeve 62 rotates about second bearing 76 which, in turn, causes a rotation of ball 68 in cavity 74 and a rotation of elongated piece 60 about bearing 56. Once pieces 60 and 62 are rotated sufficiently, the upward force is released and elongated piece 60 and elongated sleeve 62 separate at ball 68 and cavity 74. As shown in FIGS. 6 and 19B–F, elongated sleeve simply hangs down from cross piece 78 until needed. Elongated piece 60 is stored until needed again.

The fixed rail assembly 16 rotates about pivot 25 whereby the bottom of the front edge of each fixed rail 42 rests atop cross piece 78 ready for attachment of detachable rail assembly 18 described further below.

To return to the hauling position, the process is simply reversed. It should be noted that the use of ball 68 and cavity 74 provides leverage to allow a user to exert the force needed to create the upward force previously described. In addition, the elongated sleeve 62 and elongated piece 60 are offset from the centerline towards the truck 28 to allow the two pieces to snap into place, being held together by ball 68 and cavity 74 combination. This snap in feature allows the user to install pin 90 in a safe "hands free" manner.

Carriage 14 includes two sliding rails 92 which are slidably mounted atop fixed rails 42. In the preferred embodiment best seen in FIG. 9, fixed rails 42 are box beams while sliding rails 92 show an inverted U-shape having a top 95 and opposing sides 96 which encompasses fixed rails 42. To provide ease of sliding, roller bearings 94 are mounted to a shaft 97 extending between opposing sides 96.

In the hauling position, sliding rails 92 are locked to fixed rails 42 via mechanisms depicted in FIGS. 7 and 12. In FIG. 7, motion is prevented by a forwardly extending bolt 98 having a handle 100 which engages two horizontal threaded cylinders 102 and 104 mounted on the sliding rail 92 and the fixed rail 42 respectively. In FIG. 12, motion is prevented by an upwardly extending bolt 106 having a handle 108 which engages vertical threaded cylinders 110 and 112 mounted on the fixed rail 42 and sliding rail 92, respectively.

Sliding rails 92 are joined together by two wheel mount shafts 114 and a rear cable attachment assembly 116. Cable attachment assembly 116 includes two cross members 118 extending between sliding rails 92 and angled cross members 120 extending between cross members 118. A pulley 122 is mounted to the forwardmost cross member 118. Cable 54 is attached to a cable mount 124 on the rearmost cross member 118, threads over pulley 122 and hence to spindle 52.

In the preferred embodiment a pair of riding wheels 126 and a loading wheel 130 are mounted to the front of carriage 14. In the hauling position, both riding wheels 126 and loading wheel 130 are positioned between sliding rails 92. In the loading position, riding wheels 126 are positioned below sliding rails 92 while loading wheel 130 is centered between and above sliding rails 92. Carriage 14 rides on riding wheels 126 on the ground while loading wheel 130 engages the vehicle being loaded.

As best seen in FIGS. 16 and 17, rotation of wheels 126 and 130 between the respective positions is accomplished by mounting said wheels to a pivoting wheel mount 132. Pivoting wheel mount 132 is generally a wheel post 133 pivotally connected to wheel mount shafts 114 at one end thereof and includes a wheel axle 134 at the other end thereof.

An alternate preferred embodiment illustrated in FIG. 17 provides two wheel posts 133 on either side of wheels 126 or 130 with wheel axle 134 extending therebetween. To hold wheels 126 and 130 in either the hauling position or the loading position, a retaining pin 136 engages positioning holes 138a in the wheel post and 138b in the sliding rail.

In the alternate embodiment of FIG. 17, pin 136 engages positioning holes 138a which are positioned in pin posts 140 which are positioned on either side of sliding rail 92 to engage positioning holes 138b therein. In the embodiment of FIG. 17, wheel mount shaft 114 is rotatably mounted via shaft bearings 142 atop sliding rail 92. Pin posts 140 are mounted to either side of shaft bearings 142. Wheel mounts 132 are directly attached to wheel mount shaft 114 and rotates as a unit therewith. In this embodiment, the user employs pin posts 140 to rotate wheel mount shafts 114 and the attached wheels 126 and 130 between the loading and hauling positions.

Figure 3:
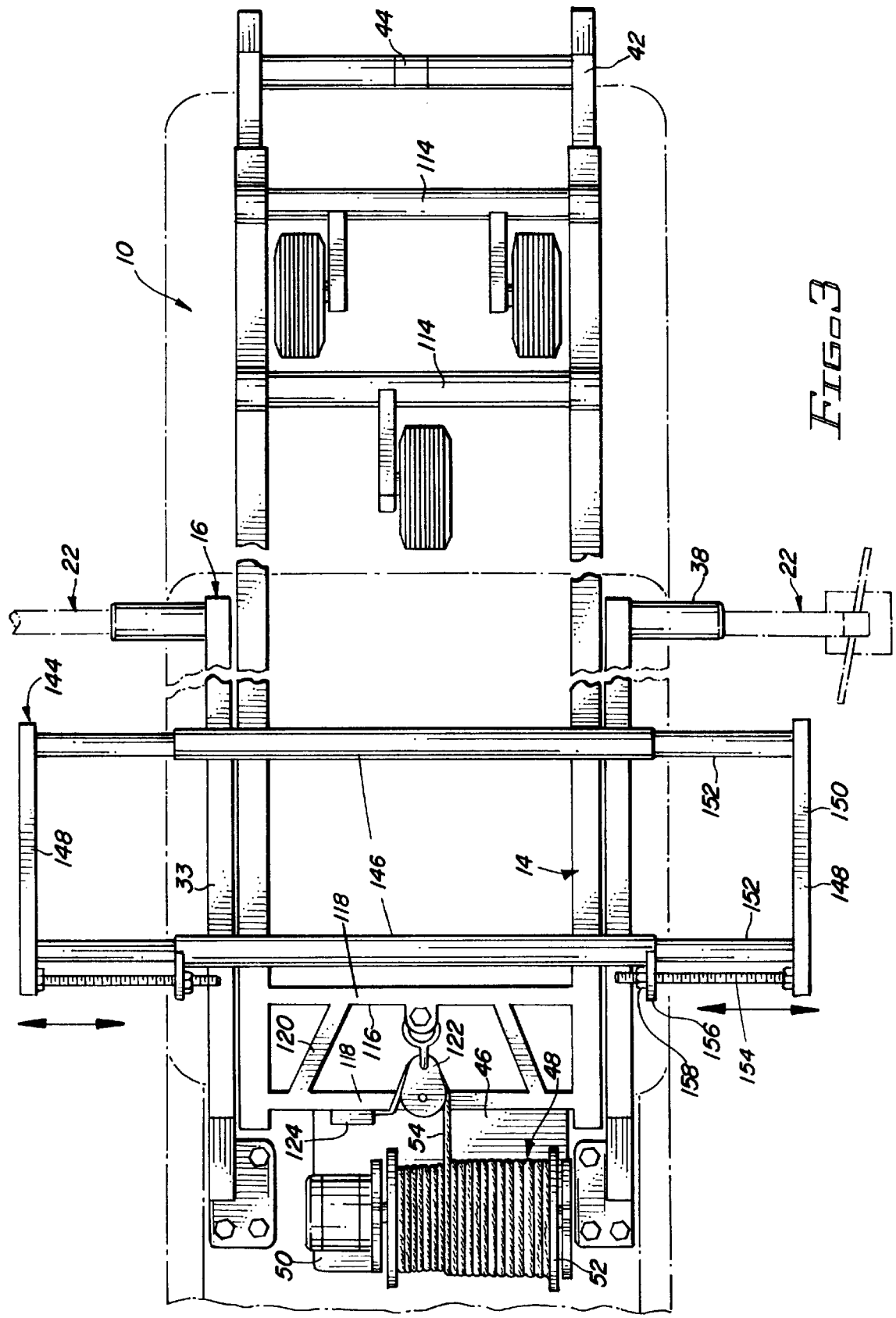
FIG. 3 is a top view of the embodiment of FIG. 1 in the hauling position.

An adjustable bed 144 is preferably mounted to the rear of carriage 14. As best seen in FIG. 3, bed 144 includes two parallel hollow tubular members 146 mounted horizontally and at right angles across the top of sliding rails 92. Two U-shaped members 148 are provided. Each U-shaped member includes two telescoping tubular members 152 which telescope into parallel hollow tubular members 146 and are joined together with a cap 150 extending therebetween.

To maintain the desired distance between said parallel hollow tubular members 146 and cap 150, a spacing bolt 154 extends from each cap 150 through a retainer wall 156 mounted to one of said parallel hollow tubular members 146 to engage a spacing nut 158.

In the preferred embodiment, side jacks 22 are used to provide stability when loading and unloading vehicles from the apparatus 10. As best seen in FIGS. 8 and 10, side jacks 22 comprise a telescoping vertical leg 162, a horizontal support leg 164 which extends into hollow tubular member 38 and an angled cross support 166 extending between horizontal support leg 164 and telescoping vertical leg 162.

Telescoping vertical leg 162, in turn, comprises an upper portion 168 and a lower portion 170 which telescopes into upper portion 168. The spaced relationship between upper portion 168 and lower portion 170 is maintained by a spacer pin 172 which extends through mating holes in said portions.

As best seen in FIG. 11, the interior of lower portion 170 is preferably threaded and engages one end of a foot bolt 174. The opposing end of foot bolt 174 is a wide foot 176 which actually engages the ground. A large wing nut 178 allows the user to make certain that foot 176 is in firm contact with the ground.

As best seen in FIGS. 19B–E, side jacks 22 are placed in position which prevents the weight of any vehicle from collapsing cab 30 during the transition from hauling to loading positions.

As best seen in FIGS. 19D–F, detachable rail assembly 18 comprises upper telescoping rail 180 and lower telescoping rail 181. As best seen in FIGS. 13–15, at one end telescoping rail 180 includes a hook 182 which engages front frame cross piece 78. The rear edge of telescoping rail 180 now mates with the front edge of fixed rails 42 as best seen in FIGS. 13B and 15. Once attached, lower telescoping rail 181 can be slid into and out of upper telescoping rail 180 until contact with the ground is achieved.

FIGS. 19A to 19G detail the operation of the present invention. In FIG. 19A, the initial hauling position is shown. To drop to the loading position of FIG. 19G, the following steps are undertaken.

First, side jacks 22 are deployed. Horizontal support legs 164 are inserted into hollow tubular members 38. Telescoping vertical legs 162 are grossly adjusted to contact the ground by placement of spacer pin 172 in an appropriate hole. Next, wide feet 176 of vertical legs 162 are finely adjusted to firm contact with the ground via use of foot bolt 174 and large wing nut 178.

Secondly, as best seen in FIG. 19B, front frame assembly 20 is broken down. Specifically, pin 90 is removed and elongated sleeve 62 rotates about second bearing 76 which, in turn, causes a rotation of ball 68 in cavity 74 and a rotation of elongated piece 60 about bearing 56. Once pieces 60 and 62 are rotated sufficiently, elongated piece 60 and elongated sleeve 62 separate at ball 68 and cavity 74. As shown in FIG. 19B, elongated sleeve 62 simply hangs down from cross piece 78 until needed. Elongated piece 60 is stored until needed again.

At this time, bolts 98 and 106 are released and carriage 14 is free to move on fixed rail assembly 16 controlled only by winch 48. Carriage 14 is moved forward until, as best seen in FIG. 19C, its weight causes fixed rail assembly 16 to rotate about pivot 25 whereby the bottom of the front edge of each fixed rail 42 rests atop cross piece 78.

Next, as shown in FIG. 19D, detachable rail assembly 18 is attached to front frame cross piece 78 via hook 182. Lower telescoping rail 181 is slid out of telescoping rail 180 until firm contact with the ground is made. In addition, jack stands 22 are placed in position at this time.

Carriage 14 descends fixed rail assembly 16 and continues onto detachable rail assembly 18 as controlled by winch 48. As shown in FIG. 19E, wheels 126 and 130 are rotated to the loading position. Wheels 126 allow the carriage to continue movement once it contacts the ground as shown in FIG. 19F. Carriage 14 is eventually flat on the ground as shown in FIG. 19G.

For purposes of illustration, a dune buggy 184 is shown loaded onto carriage 14 in FIG. 19G. Rear wheels 186 of buggy 184 rest in adjustable bed 144 while wheel 130 supports the front of buggy 184. Once buggy 184 is loaded onto carriage 14, winch 48 is reversed and pulls carriage 14 onto fixed rail assembly 16. Once carriage 14 is pulled far enough, the weight of carriage 14 and buggy 184 will rotate fixed rail assembly 16 back into the hauling position.

Those skilled in the art will recognize that this invention is suitable for use with a wide variety of vehicles such as ATV's, snowmobiles, personal watercraft, etc.

Although only certain embodiments have been illustrated and described, it will be apparent to those skilled in the art that various changes and modifications may be made therein without departing from the spirit of the invention or from the scope of the appended claims.

What is claimed is:

1. A balance point carriage device suitable for use with a vehicle, the balance point carriage device comprising, in combination:
   a support frame mounted to a frame of the vehicle,
   a rail assembly mounted to the support frame at a pivot, a detachable rail assembly having telescoping rail, the detachable rail assembly mating with the rail assembly,
   a carriage slidably mounted on the rail assembly and detachable rail assembly,
   means for sliding the carriage along the rail assembly and the detachable rail assembly, and
   a foldable frame assembly mounted to the frame of the vehicle, one end of the rail assembly being detachably secured to the foldable frame assembly, the rail assembly having a hauling position parallel to the ground when secured to the foldable frame assembly, the pivot being positioned at a balance point of the combination of the fixed rail assembly and the carriage in the hauling position, the rail assembly rotating about the pivot to a loading position tilted to the ground in the direction of the foldable frame assembly when detached from the foldable frame assembly, the detachable rail assembly attaching to the rail assembly when in the loading position, the detachable rail assembly contacting the ground.

2. The device of claim 1 further comprising two side jacks detachably mounted to the pivot, the side jacks engaging the ground in the loading position to support the device thereon.

3. The device of claim 1 further having the pivot positioned at the front of the cab of the vehicle and the foldable frame assembly being attached at the front of the vehicle.

4. The device set forth in claim 1 wherein said support frame includes two inverted L-shaped members, each L-shaped member having a vertical leg and a horizontal leg, each vertical leg being mounted near the middle of the frame of the vehicle, each horizontal leg extending forwardly from the top of each vertical leg to the front of the cab, the support frame further comprising cross members extending between the horizontal legs.

5. The device of claim 4 wherein the pivot comprises a a hollow tubular member mounted to and extending between the forwardmost portions of the horizontal legs, the hollow tubular member having two bearing collars which are rotatably mounted on opposing sides of the hollow tubular member and mounted to the rail assembly.

6. The device of claim 1 wherein the rail assembly comprises two fixed rails mounted at their midpoints to the pivot, the fixed rails being parallel and extending forwardly and rearwardly from the pivot, the rail assembly further comprising cross members extending between the fixed rails.

7. The device of claim 6 further comprising means for limiting the rotation of the fixed rails in both directions.

8. The device of claim 1 wherein the means for sliding the carriage along the rail assembly comprises a winch mounted to the rail assembly, the winch being operatively connected to the carriage.

9. The device of claim 1 wherein the foldable frame assembly comprises a bearing having a sleeve which is rotatably mounted to the rail assembly, an elongated piece having one end which is slidably received within the sleeve, the elongated piece having a ball mounted at the other end, an elongated sleeve capturing said elongated piece therewithin, the elongated sleeve having a cavity at its midpoint which receives the ball therein, the elongated sleeve being rotatably mounted to a cross piece which is mounted to a forward frame.

10. The device of claim 9 further comprising a pin which extends through mating holes in said elongated piece and said elongated sleeve to hold said elongated piece and said elongated sleeve in position.

11. The device of claim 6 wherein the carriage comprises two sliding rails which are slidably mounted atop the fixed rails, the sliding rails being interconnected with shafts extending therebetween.

12. The device of claim 11 further comprising roller bearings interposed between said fixed rails and said sliding rails to provide ease of sliding therebetween.

13. The device of claim 11 further comprising means for locking said fixed rails to said sliding rails in the hauling position.

14. The device of claim 11 wherein the means for sliding the carriage along the rail assembly comprises a winch mounted to the rail assembly, the winch being connected to a cable attachment assembly mounted on one of said shafts.

15. The device of claim 11 comprising a pair of riding wheels and a loading wheel mounted to the shafts.

16. The device of claim 11 further comprising an adjustable bed mounted to the rear of the carriage.

17. The device of claim 16 wherein said adjustable bed comprises two parallel hollow tubular members mounted horizontally and at right angles across the top of the sliding rails, two U-shaped members having two telescoping tubular members which telescope into the parallel hollow tubular members and are joined with a cap extending therebetween, a spacing bolt extending from each cap through a retainer wall mounted to one of the parallel hollow tubular members and engaging a spacing nut.

18. A balance point carriage device suitable for use with a vehicle, the balance point carriage device comprising, in combination:
   a support frame mounted to a frame of the vehicle, the support frame including two inverted L-shaped members, each L-shaped member having a vertical leg and a horizontal leg, each vertical leg being mounted near the middle of the frame of the vehicle, each horizontal leg extending forwardly from the top of each vertical leg to the front of the cab, the support frame further comprising cross members extending between the horizontal legs,
   a rail assembly mounted to the support frame at a pivot, the rail assembly comprising two fixed rails mounted at their midpoints to the pivot, the fixed rails being parallel and extending forwardly and rearwardly from the pivot, the fixed rails aligned with the horizontal legs whereby the horizontal legs limit the rotation of the rail assembly rearwardly, the rail assembly further comprising cross members extending between the fixed rails, the pivot being positioned at the front of the cab of the vehicle, the pivot comprising a hollow tubular member mounted to and extending between the forwardmost portions of the horizontal legs, the hollow tubular member having two bearing collars which are rotatably mounted on opposing sides of the hollow tubular member and mounted on one of the cross members of the rail assembly, the rotation of the rail assembly being limited, a detachable rail assembly having telescoping rails, the detachable rail assembly mating with the rail assembly, a carriage slidably mounted on the rail assembly and detachable rail assembly, the carriage comprising two sliding rails which are slidably mounted atop the fixed rails, the sliding rails being interconnected with shafts extending therebetween, the carriage further having a pair of riding wheels and a loading wheel mounted to the shafts, an adjustable bed mounted to the rear of the carriage, said adjustable bed comprising two parallel hollow tubular members mounted horizontally and at right angles across the top of the sliding rails, two U-shaped members having two telescoping tubular members which telescope into the parallel hollow tubular members and are joined with a cap extending therebetween, a spacing bolt extending from each cap through a retainer wall mounted to one of the parallel hollow tubular members and engaging a spacing nut, roller bearings interposed between said fixed rails and said sliding rails to provide ease of sliding therebetween, a winch mounted to the rail assembly, the winch being connected to a cable attachment assembly mounted on the carriage for sliding the carriage along the rail assembly and the detachable rail assembly, a foldable frame assembly mounted at the front of the vehicle, one end of the rail assembly being detachably secured to the foldable frame assembly, the foldable frame assembly comprising a bearing having a sleeve which is rotatably mounted to one of the cross members of the rail assembly, an elongated piece having one end which is slidably received within the sleeve, the elongated piece having a ball mounted at the other end, an elongated sleeve capturing said elongated piece therewithin, the elongated sleeve having a cavity at its midpoint which receives the ball therein, the elongated sleeve being rotatably mounted to a cross piece which is mounted to a forward frame, the rail assembly having a hauling position parallel to the ground when secured to the foldable frame assembly, the pivot being positioned at a balance point of the combination of the fixed rail assembly and the carriage in the hauling position, the rail assembly rotating about the pivot to a loading position contacting the cross piece and being tilted to the ground in the direction of the foldable frame assembly when detached from the foldable frame assembly, the detachable rail assembly attaching to the rail assembly when in the loading position, the detachable rail assembly contacting the ground, means for locking said fixed rails to said sliding rails in the hauling position, and side jacks detachably mounted to the pivot for supporting the device in the loading position.

\* \* \* \* \*